(12) United States Patent
Chanler et al.

(10) Patent No.: US 11,347,636 B2
(45) Date of Patent: May 31, 2022

(54) CASCADING PID CONTROLLER FOR METADATA PAGE EVICTION

(71) Applicant: EMC IP HOLDING COMPANY LLC, Hopkinton, MA (US)

(72) Inventors: Andrew Chanler, Berlin, MA (US); Mathew Pilozzi, Hopedale, MA (US)

(73) Assignee: Dell Products L.P., Hopkinton, MA (US)

( * ) Notice: Subject to any disclaimer, the term of this patent is extended or adjusted under 35 U.S.C. 154(b) by 123 days.

(21) Appl. No.: 16/813,886

(22) Filed: Mar. 10, 2020

(65) Prior Publication Data

US 2021/0286716 A1  Sep. 16, 2021

(51) Int. Cl.
*G06F 12/02* (2006.01)
*G05B 11/42* (2006.01)
*G06F 12/0868* (2016.01)

(52) U.S. Cl.
CPC .......... *G06F 12/0246* (2013.01); *G05B 11/42* (2013.01); *G06F 2212/1044* (2013.01); *G06F 2212/7207* (2013.01)

(58) Field of Classification Search
None
See application file for complete search history.

(56) References Cited

U.S. PATENT DOCUMENTS

| | | | | |
|---|---|---|---|---|
| 2012/0221774 A1* | 8/2012 | Atkisson | ............. | G06F 12/0895 711/103 |
| 2014/0208046 A1* | 7/2014 | Baryudin | ............... | G11C 16/00 711/159 |
| 2015/0227468 A1* | 8/2015 | Berger | ...................... | G06F 3/06 711/203 |
| 2016/0048401 A1* | 2/2016 | Bhat | ..................... | G06F 3/0604 718/1 |

* cited by examiner

*Primary Examiner* — Michael Alsip
(74) *Attorney, Agent, or Firm* — Anderson Gorecki LLP

(57) ABSTRACT

In a storage system that implements metadata paging, the page free pool is replenished in the background to reduce foreground evictions and associated latency on page-in. A two-level page eviction controller with cascaded proportional, integral, derivative (PID) controllers optimizes the size of the free page pool and optimizes the rate at which pages are freed in the background. By optimizing these two parameters the page eviction controller dynamically maximizes used pages (minimizing free pages) to increase the metadata cache hit ratio. Optimizing the parameters also reduces the chances of foreground page evictions, thereby reducing IO latency, during both steady state and burst page-in requests.

8 Claims, 4 Drawing Sheets

CASCADING PID CONTROLLER FOR METADATA PAGE EVICTION

TECHNICAL FIELD

The subject matter of this disclosure is generally related to data storage systems, and more particularly to metadata paging.

BACKGROUND

Enterprise data storage systems such as storage area networks (SANs) and network-attached storage (NAS), among various types, are used to maintain large data sets and contemporaneously support many users. The amount of data maintained by such storage systems has grown as the capacity of drives has increased and the cost per unit of storage capacity has decreased. Somewhat problematically, increasing the size of a data set that is maintained by a storage system also increases the size of the metadata associated with that data set. The metadata may include various information about the data, including an indication of where the data is stored on the drives. For performance reasons it has been standard practice to design storage systems that maintain all metadata in low-latency volatile memory. However, the amount of volatile memory required to maintain all metadata can become prohibitively costly as the average size of data sets continues to increase. Metadata paging is a technique that helps to reduce the amount of volatile memory used for metadata. In storage systems that implement metadata paging the metadata is maintained in less costly non-volatile storage and copied into volatile memory in fixed-size pages (paged-in) from non-volatile storage as needed. The portion of memory dedicated for metadata may be fixed in size and pages are evicted as free space is required to page-in other metadata. Thus, only a portion of the metadata resides in memory at any given time.

SUMMARY

All examples, aspects and features mentioned in this document can be combined in any technically possible way.

In accordance with some implementations an apparatus comprises: at least one computing node comprising a processor and memory; at least one non-volatile drive managed by the at least one computing node; a data set maintained on the at least one non-volatile drive; metadata for the data set, the metadata maintained on the at least one non-volatile drive; and a metadata paging controller that copies pages of the metadata from the at least one non-volatile drive to free pages of a free pool in the memory as needed and evicts pages of metadata from the memory, the metadata paging controller adjusting a target size of the free pool based on a free pool relative minimum setpoint for a time period. In some implementations the metadata paging controller adjusts the target size of the free pool based on a difference between the free pool relative minimum setpoint for the time period and an actual free pool relative minimum for the time period. In some implementations the metadata paging controller adjusts a background page eviction rate based on the target size of the free pool. In some implementations the metadata paging controller adjusts the background page eviction rate based on a difference between the target size of the free pool and actual size of the free pool. In some implementations the metadata paging controller calculates the difference between the free pool relative minimum setpoint for the time period and an actual free pool relative minimum for the time period combined with a number of foreground evictions occurring in the time period. In some implementations the metadata paging controller comprises cascaded proportional-integral-derivative (PID) controllers. In some implementations the pages of metadata and the free pages of the free pool are in a dedicated portion of the memory.

In accordance with some implementations a method comprises: in a storage system comprising at least one computing node comprising a processor and memory, at least one non-volatile drive managed by the at least one computing node, a data set maintained on the at least one non-volatile drive, and metadata for the data set, the metadata maintained on the at least one non-volatile drive: copying pages of the metadata from the at least one non-volatile drive to free pages of a free pool in the memory as needed; and evicting pages of metadata from the memory based on adjusting a target size of the free pool based on a free pool relative minimum setpoint for a time period. Some implementations comprise adjusting the target size of the free pool based on a difference between the free pool relative minimum setpoint for the time period and an actual free pool relative minimum for the time period. Some implementations comprise adjusting a background page eviction rate based on the target size of the free pool. Some implementations comprise adjusting the background page eviction rate based on a difference between the target size of the free pool and actual size of the free pool. Some implementations comprise calculating the difference between the free pool relative minimum setpoint for the time period and an actual free pool relative minimum for the time period combined with a number of foreground evictions occurring in the time period. Some implementations comprise adjusting with cascaded proportional-integral-derivative (PID) controllers. Some implementations comprise maintaining the pages of metadata and the free pages of the free pool in a dedicated portion of the memory.

Some implementations comprise a computer-readable storage medium storing instructions that when executed by a computer cause the computer to perform a method for using a computer system to evict pages of metadata from memory, the method comprising: copying pages of the metadata from a non-volatile drive to free pages of a free pool in the memory as needed; and evicting pages of metadata from the memory based on adjusting a target size of the free pool based on a free pool relative minimum setpoint for a time period. In some implementations the method further comprises adjusting the target size of the free pool based on a difference between the free pool relative minimum setpoint for the time period and an actual free pool relative minimum for the time period. In some implementations the method further comprises adjusting a background page eviction rate based on the target size of the free pool. In some implementations the method further comprises adjusting the background page eviction rate based on a difference between the target size of the free pool and actual size of the free pool. In some implementations the method further comprises calculating the difference between the free pool relative minimum setpoint for the time period and an actual free pool relative minimum for the time period combined with a number of foreground evictions occurring in the time period. In some implementations the method further comprises adjusting with cascaded proportional-integral-derivative (PID) controllers.

Other aspects, features, and implementations may become apparent in view of the detailed description and figures.

DETAILED DESCRIPTION

The terminology used in this disclosure is intended to be interpreted broadly within the limits of subject matter eligibility. The terms "disk" and "drive" are used interchangeably herein and are not intended to refer to any specific type of non-volatile storage. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof.

Aspects of the inventive concepts are described as being implemented in a data storage system that includes host servers and a storage area network (SAN), which may also be referred to as a storage array. Such implementations should not be viewed as limiting. Those of ordinary skill in the art will recognize that there are a wide variety of implementations of the inventive concepts in view of the teachings of the present disclosure. Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
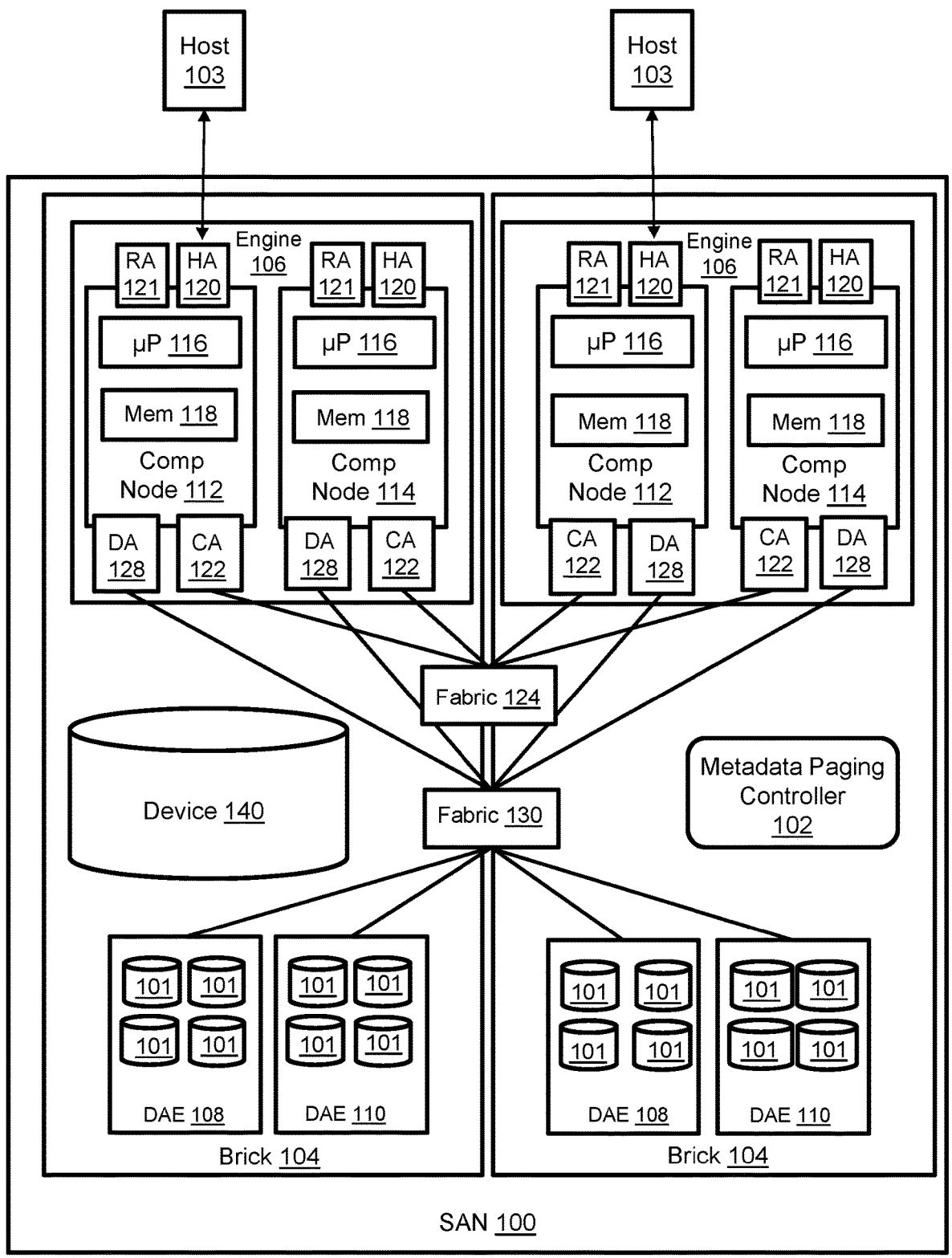
FIG. 1 illustrates a SAN with a metadata paging controller that includes a cascading PID controller for metadata page eviction.

FIG. 1 illustrates a SAN 100 that implements metadata paging. A metadata paging controller 102 manages copying of pages of metadata between non-volatile storage and memory in page-in and page-out operations. As will be explained in greater detail below, the metadata paging controller 102 includes a cascading PID controller for managing metadata page evictions. The SAN is depicted in a simplified data center environment that includes two hosts 103. The hosts may be server computers that include volatile memory, non-volatile storage, one or more tangible processors, and a hypervisor or operating system. Instances of applications (host applications) running on each host use data that is maintained by the SAN. Examples of host applications may include email programs, inventory control programs, and accounting programs, for example and without limitation.

The SAN 100 includes one or more bricks 104. Each brick includes an engine 106 and one or more drive array enclosures (DAEs) 108, 110. Each DAE includes managed drives 101 which are non-volatile media such as, without limitation, solid-state drives (SSDs) based on EEPROM technology such as NAND and NOR flash memory and hard disk drives (HDDs) with spinning disk storage media. Each engine 106 includes a pair of interconnected computing nodes 112, 114, which may be referred to as "storage directors." Each computing node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each computing node includes one or more host adapters (HAs) 120 for communicating with the hosts 103. Each host adapter has resources for servicing input-output commands (IOs) from the hosts. The resources may include processors, volatile memory, and ports via which the hosts may access the SAN. Each computing node also includes a remote adapter (RA) 121 for communicating with other storage systems. Each computing node also includes one or more drive adapters (DAs) 128 for communicating with the managed drives 101 in the DAEs 108, 110. Each drive adapter has processors, volatile memory, and ports via which the computing node may access the DAEs for servicing IOs. Each computing node may also include one or more channel adapters (CAs) 122 for communicating with other computing nodes via an interconnecting fabric 124. The paired computing nodes 112, 114 of each engine 106 provide failover protection and may be directly interconnected by communication links. An interconnecting fabric 130 enables implementation of an N-way active-active backend. A back-end connection group includes all drive adapters that can access the same drive or drives. In some implementations every drive adapter 128 in the SAN can reach every DAE via the fabric 130. Further, in some implementations every drive adapter in the SAN can access every managed drive 101 in the SAN.

Data associated with the hosted application instances running on the hosts 103 is maintained on the managed drives 101. The managed drives 101 are not discoverable by the hosts but the SAN 100 creates a logical storage device 140 that can be discovered and accessed by the hosts. Without limitation, the logical storage device may be referred to as a source device, production volume, production device, or production LUN, where the logical unit number (LUN) is a number used to identify logical storage volumes in accordance with the small computer system interface (SCSI) protocol. From the perspective of the hosts, the logical storage device 140 is a single drive having a set of contiguous fixed-size logical block addresses (LBAs) on which data used by the instances of the host application resides. However, the host application data is stored at non-contiguous addresses on various managed drives 101.

Figure 2:
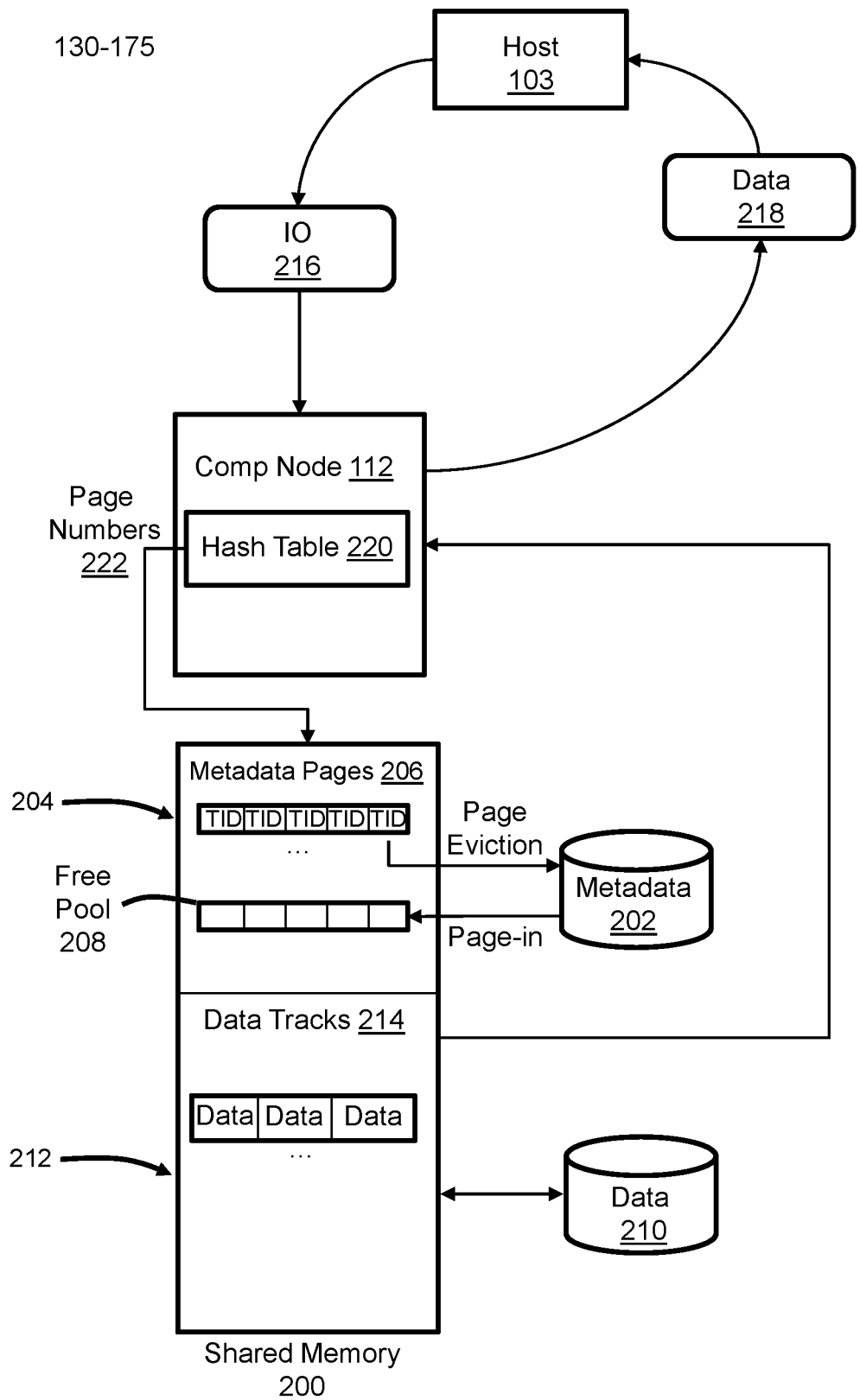
FIGS. 2 and 3 illustrate aspects of metadata page-in and eviction.

Referring to FIG. 2, each computing node dedicates a portion or partition of its respective local memory to a logical shared memory 200 that can be accessed by other computing nodes, e.g. via direct memory access (DMA) or remote DMA (RDMA), for servicing IOs. A complete record of all metadata 202 for device 140 (FIG. 1) is maintained on the managed drives 101 (FIG. 1). A first portion 204 of the shared memory 200 is dedicated for holding selected metadata pages 206 that are copied (paged-in) from the complete metadata record 202. New metadata may also be created in the first portion 204 of the shared memory but that aspect is not directly related to the concepts described herein. The pages of metadata, which may all have a single fixed size, include track identifications (TIDs) that indicate, among other things, where associated tracks of data are in the shared memory and managed drives. A free pool 208 of empty address space that does not contain pages of metadata facilitates efficient page-in of metadata from the managed drives by providing already-available free space in the shared memory when it becomes apparent that metadata page-ins are required. Pages of metadata may be evicted from the first portion of the shared memory in page-out operations, e.g. moved to the managed drives 101 (FIG. 1) if the page has been updated in the shared memory, thereby increasing the size of the free pool 208. A complete record of all data 210 for device 140 (FIG. 1) is maintained on the managed drives. A second portion 212 of the shared memory 200 is dedicated for temporarily holding selected tracks 214 of the data, where tracks are allocation units that all have the same fixed size. For example, tracks that are required to process IOs are copied into the second portion of the shared memory and tracks that are no longer required are destaged to storage or flushed from the shared memory if the data is not dirty.

In response to an IO command 216 sent by a host 103 to read data 218 from device 140 (FIG. 1) a computing node 112 uses a hash table 220 to obtain the page numbers 222 of the pages associated with the requested data. The page numbers are used to find the corresponding pages of metadata in the first portion 204 of the shared memory 200. The TIDs in those pages are used to find and obtain the corresponding data in the second portion 212 of the shared memory. However, the pages indicated by the page number are not necessarily located in the shared memory when the IO is received. The pages indicated by the page numbers may be paged-in from the complete metadata record 202 in non-volatile storage, e.g. copied into free pages from the free pool 208 if free pages are available. However, the free pool may be rapidly depleted when bursts of IOs are received. Depletion of the free pool may cause troublesome foreground page evictions if the background page eviction rate is in adequate, as will be described below.

Figure 3:
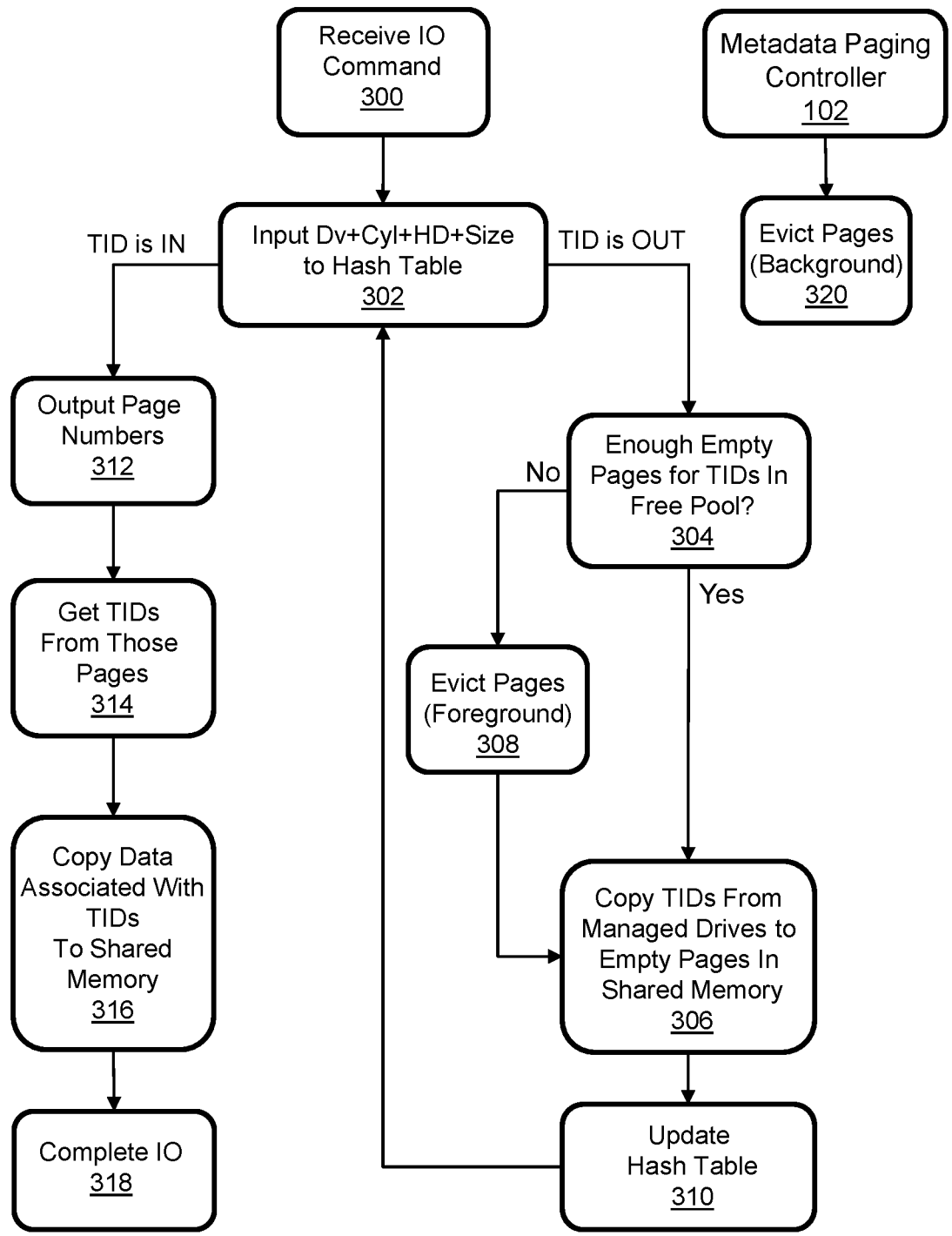

Referring to FIG. 3, when the computing node 112 (FIG. 2) receives the IO command 216 (FIG. 2) as indicated in step 300, the device number, cylinder number, head, and size are inputted to a hash table 220 (FIG. 2) as indicated in step 302. If there is no entry in the hash table corresponding to the inputted information, then the TID is OUT of the shared memory 200 (FIG. 2). In that case, which may be referred to as a cache miss, the computing node determines whether there are enough empty pages in the free pool 208 (FIG. 2) to accommodate the TIDs as indicated in step 304. If there are enough empty pages in the free pool, then the TIDs are copied from the managed drives 101 (FIG. 1) into the shared memory as indicated in step 306. If there are not enough empty pages in the free pool, then some of the pages in the first portion 204 (FIG. 2) of the shared memory are evicted as indicated in step 308. For example, if n additional empty pages are needed to accommodate the TIDs then at least n pages are evicted from the shared memory. Such eviction for the purpose of freeing space for page-in related to a pending IO is referred to as foreground eviction. Foreground eviction causes latency because it is necessary to determine how many pages to evict, determine which pages to evict, and then evict those pages before the pages needed to process the pending IO can be paged-in. Selection of pages for eviction may be based on a variety of factors such as how recently the page was accessed, e.g., evicting the least recently accessed pages. The hash table is updated once the TIDs have been paged-in as indicated in step 310.

Having updated the hash table in step 310, re-inputting the device number, cylinder number, head, and size to the hash table as indicated in step 302 will now yield the page numbers as indicated in step 312. The TIDs are obtained from the corresponding pages as indicated in step 314. The data associated with the TIDs is copied into the shared memory from the managed drives as indicated in step 316. The data in the shared memory is then used to complete processing of the IO as indicated in step 318.

Pages of metadata may be evicted in the background under the control of the metadata paging controller 102 as indicated in step 320. Unlike the foreground page evictions, background page evictions are not performed to free a certain number of pages based on a number of pages that need to be paged-in to service a pending IO. Background page evictions may be performed to maintain an adequately sized free pool 208 (FIG. 2), e.g. such that IO bursts can be sustained without, or with fewer, foreground page evictions. Pages may be selected for background eviction on the same basis as foreground eviction, e.g. least recently accessed.

Figure 4:
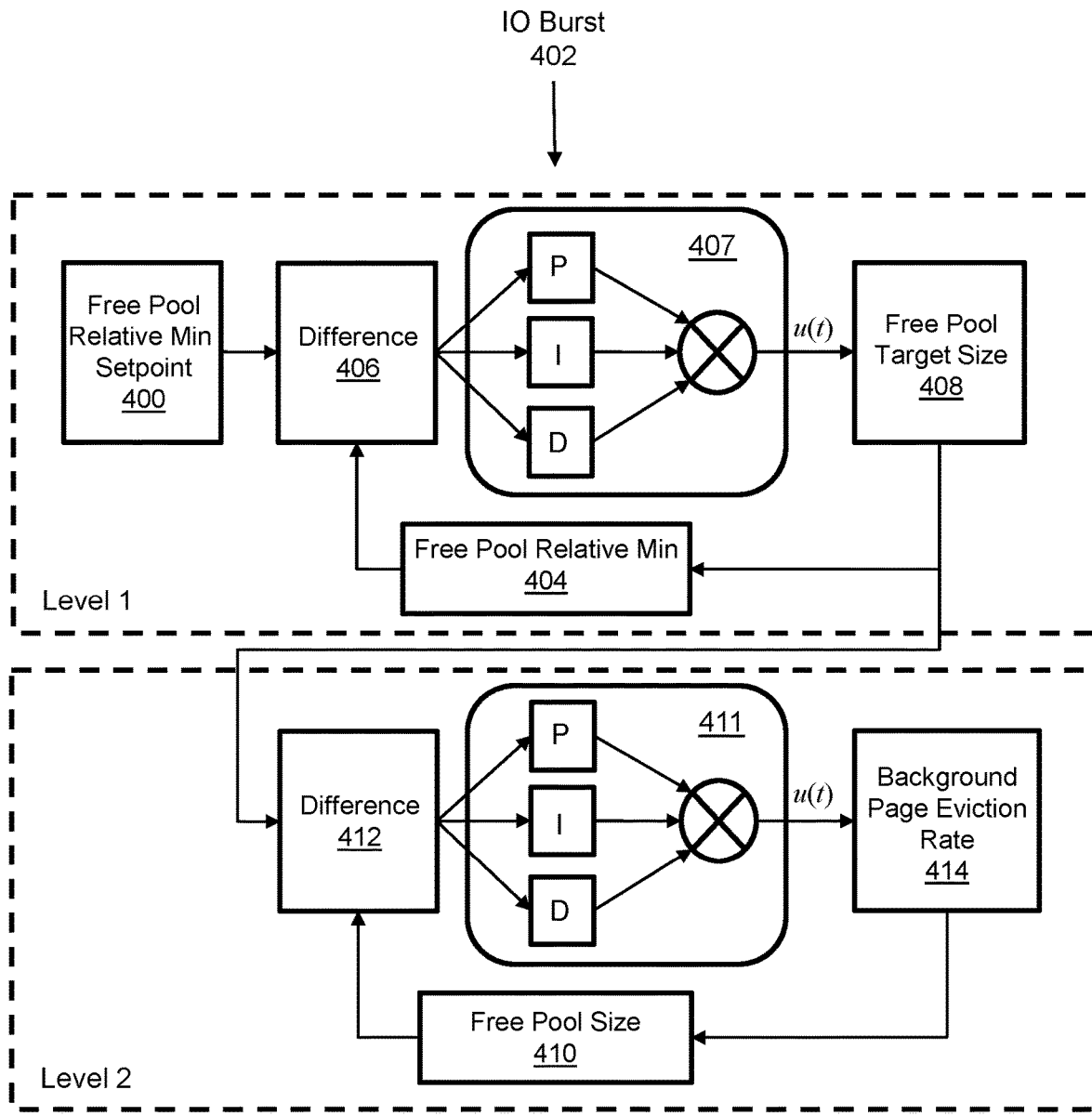
FIG. 4 illustrates the cascading PID controller of the metadata paging controller.

FIG. 4 illustrates the cascading proportional-integral-derivative (PID) controller of the metadata paging controller of FIG. 1. In a first level (Level 1) a first PID controller 407 calculates a dynamically adjustable target size for the free pool 208 (FIG. 2) for a time period. In a second level (Level 2) a dynamically adjustable background page eviction (step 320, FIG. 3) rate is calculated by a second PID controller 411 based on the target size for the free pool calculated by the first PID controller. The PID controllers apply corrections to their respective manipulated variables based on proportional, integral, and derivative terms denoted as P, I, and D. The PID controllers may generate an output u(t) with the following transfer function:

$$u(t)=K_P e(t)+K_I \int e(t)dt+K_D de(t)/dt,$$

where $K_P$, $K_I$, and $K_D$ denote the coefficients for the proportional (P), integral (I), and derivative (D) terms and e(t) is an error value that is the difference between a desired setpoint and a measured process variable. PID controllers are well known in the art and are merely an example of a type of controller that could be used to implement the inventive aspects. Other examples may include, but are not limited to, PD controllers and PI controllers. The temporal length of the period may be static, and control variable calculations may be repeated for successive time periods.

In level 1 the first PID controller 407 calculates an adjustment to the free pool target size 408 based on a free pool relative minimum setpoint 400 and the actual free pool relative minimum 404 for the period. The free pool relative minimum setpoint 400 represents the desired smallest size that the free pool becomes during any given time period in response to a disturbance such as an IO burst 402. The free pool relative minimum setpoint 400 may be expressed in a variety of units including, but not limited to, a number of free pages. For example, the free pool relative minimum setpoint may be selected to be 0 free pages or 10 free pages. The actual free pool relative minimum 404 represents the smallest size that the free pool becomes during the time period in response to the disturbance. The actual free pool relative minimum 404 during the time period is compared with the free pool relative minimum setpoint 400 to determine a difference 406, which is the error value e(t) inputted to the PID controller 407. The difference may be considered as a free page shortage or surplus for the period. For example, if the smallest size of the free pool during the period was 10 free pages and the free pool relative minimum setpoint is 10 free pages then the difference is 0 because there was no shortage or surplus. If the smallest size of the free pool during the period was 8 and the free pool relative minimum setpoint is 10 free pages, then the difference is 2 which is a shortage of two free pages. If the smallest size of the free pool during the period was 12 and the free pool relative minimum setpoint is 10 free pages, then the difference is −2 which is a surplus of two free pages. Foreground page evictions may be counted against the actual free pool relative minimum for the period. For example, if the smallest size of the free pool during the period was 0, and there were 2 foreground page evictions during the period, and the free pool relative minimum setpoint is 10 free pages, then the difference is 12. The PID controller 407 adjusts the free pool target size 408 over successive periods by applying corrections to cause the difference 406 to trend toward 0. If the actual free pool relative minimum 404 is smaller than the free pool relative minimum setpoint 400 then the free pool target size 408 may be increased. The free pool target size 408 may be increased further based on the number of foreground evictions that occurred during the period. If the actual free pool relative minimum 404 is larger than the free pool relative minimum setpoint 400 then the free pool target size 408 may be decreased. If there is no error (difference 406 equals zero), then there is no corrective response by the PID controller 407.

In level 2 the second PID controller 411 calculates an adjustment to the background page eviction rate 414. The manipulated variable (free pool target size 408) of the level 1 PID controller is used as the setpoint input in level 2. The free pool target size 408 is compared with the actual free pool size 410 to determine difference 412, which is the error used by the second PID controller 411. The second PID controller 411 applies a correction to the background page eviction rate 414 based on the proportional, integral, and derivative terms to drive the difference 412 toward 0. For example, if the actual free pool size 410 is smaller than the free pool target size 408 then the background page eviction rate 414 may be increased. If the actual free pool size 410 is larger than the free pool target size 408, then the background page eviction rate 414 may be decreased. If there is no error (difference 412 equals zero), then there is no corrective response by the second PID controller 411.

The two cascaded levels function together to dynamically adjust the free pool target size 408 and background page eviction rate 414 to achieve the free pool relative minimum setpoint 400. In some implementations this will use the shared memory more efficiently than setting a static free pool target size because the manipulated variables are adjusted in response to actual IO bursts which may change over time and differ between storage systems. Further, the free pool relative minimum setpoint 400 may be selected such that latency-inducing foreground evictions are reduced or avoided while maintaining fewer average free pages relative to a static free pool target size, thereby increasing the metadata cache hit ratio.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus, comprising:
at least one computing node comprising a processor and memory;
at least one non-volatile drive managed by the at least one computing node;
a data set maintained on the at least one non-volatile drive;
metadata for the data set, the metadata maintained on the at least one non-volatile drive; and
a metadata paging controller configured to:
copy pages of the metadata from the at least one non-volatile drive to free pages of a free pool in the memory as needed;
evict pages of metadata from the memory in the background based on a difference between a target size of the free pool and an actual size of the free pool; and
adjust the target size of the free pool based on a difference between a free pool relative minimum setpoint for a time period and an actual free pool relative minimum for the time period and a combination of the actual free pool relative minimum for the time period and a number of foreground evictions occurring in the time period, wherein the free pool relative minimum setpoint represents desired smallest size that the free pool becomes during the time period.

2. The apparatus of claim 1 wherein the metadata paging controller comprises cascaded proportional-integral-derivative (PID) controllers.

3. The apparatus of claim 2 wherein the pages of metadata and the free pages of the free pool are in a dedicated portion of the memory.

4. A method, comprising:
in a storage system comprising at least one computing node comprising a processor and memory, at least one non-volatile drive managed by the at least one computing node, a data set maintained on the at least one non-volatile drive, and metadata for the data set, the metadata maintained on the at least one non-volatile drive:
copying pages of the metadata from the at least one non-volatile drive to free pages of a free pool in the memory as needed;
evicting pages of metadata from the memory in the background based on a page eviction rate calculated based on a difference between a target size of the free pool and actual size of the free pool; and
adjusting the target size of the free pool based on a difference between a free pool relative minimum setpoint for a time period and an actual free pool relative minimum for the time period and a combination of the actual free pool relative minimum for the time period and a number of foreground evictions occurring in the time period, wherein the free pool relative minimum setpoint represents desired smallest size that the free pool becomes during the time period.

5. The method of claim 4 comprising adjusting with cascaded proportional-integral-derivative (PID) controllers.

6. The method of claim 5 comprising maintaining the pages of metadata and the free pages of the free pool in a dedicated portion of the memory.

7. A non-transitory computer-readable storage medium storing instructions that when executed by a computer cause the computer to perform a method for using a computer system to evict pages of metadata from memory, the method comprising:
  copying pages of the metadata from a non-volatile drive to free pages of a free pool in the memory as needed; and
  evicting pages of metadata from the memory in the background based on a page eviction rate calculated based on a difference between a target size of the free pool and actual size of the free pool; and
  adjusting the target size of the free pool based on a difference between a free pool relative minimum setpoint for a time period and an actual free pool relative minimum for the time period and a combination of the actual free pool relative minimum for the time period and a number of foreground evictions occurring in the time period, wherein the free pool relative minimum setpoint represents desired smallest size that the free pool becomes during the time period.

8. The non-transitory computer-readable storage medium of claim 7 wherein the method further comprises adjusting with cascaded proportional-integral-derivative (PID) controllers.

* * * * *